United States Patent [19]

Elson

[11] Patent Number: 5,277,554
[45] Date of Patent: Jan. 11, 1994

[54] TANDEM COMPRESSOR MOUNTING SYSTEM

[75] Inventor: John P. Elson, Sidney, Ohio

[73] Assignee: Copeland Corporation, Sidney, Ohio

[21] Appl. No.: 975,847

[22] Filed: Nov. 13, 1992

[51] Int. Cl.⁵ .............................................. F04B 39/00
[52] U.S. Cl. .................................. 417/363; 417/902; 248/638; 248/657
[58] Field of Search ................ 417/363, 902; 248/638, 248/659, 678

[56] References Cited

U.S. PATENT DOCUMENTS

| | | | |
|---|---|---|---|
| 3,469,809 | 9/1969 | Reznick et al. ................ | 248/638 X |
| 4,105,374 | 8/1978 | Scharf ............................ | 417/902 X |
| 4,842,095 | 6/1989 | Rozek ............................ | 248/638 X |
| 4,946,351 | 8/1990 | Richardson, Jr. . | |
| 4,984,971 | 1/1991 | Bergeron ....................... | 417/902 X |
| 5,040,953 | 8/1991 | Tinsler . | |

FOREIGN PATENT DOCUMENTS

| 214284 | 9/1987 | Japan ................................... 417/363 |
|---|---|---|
| 81582 | 4/1991 | Japan ................................... 417/363 |

Primary Examiner—Richard E. Gluck
Attorney, Agent, or Firm—Harness, Dickey & Pierce

[57] ABSTRACT

A tandem compressor mounting system has a set of four elastomeric grommets for mounting each of the compressors to a pair of common rails. Each of the elastomeric grommets is secured to a mounting plate located on each of the two compressors and are disposed between the mounting plates and the common rails. Each of the two sets of elastomeric grommets are made from 65 durometer neoprene. A third set of four elastomeric grommets, two for each of the common rails, is disposed between the common rails and a generally horizontal mounting surface. Each of the third set of elastomeric grommets is made from 40 durometer neoprene.

23 Claims, 3 Drawing Sheets

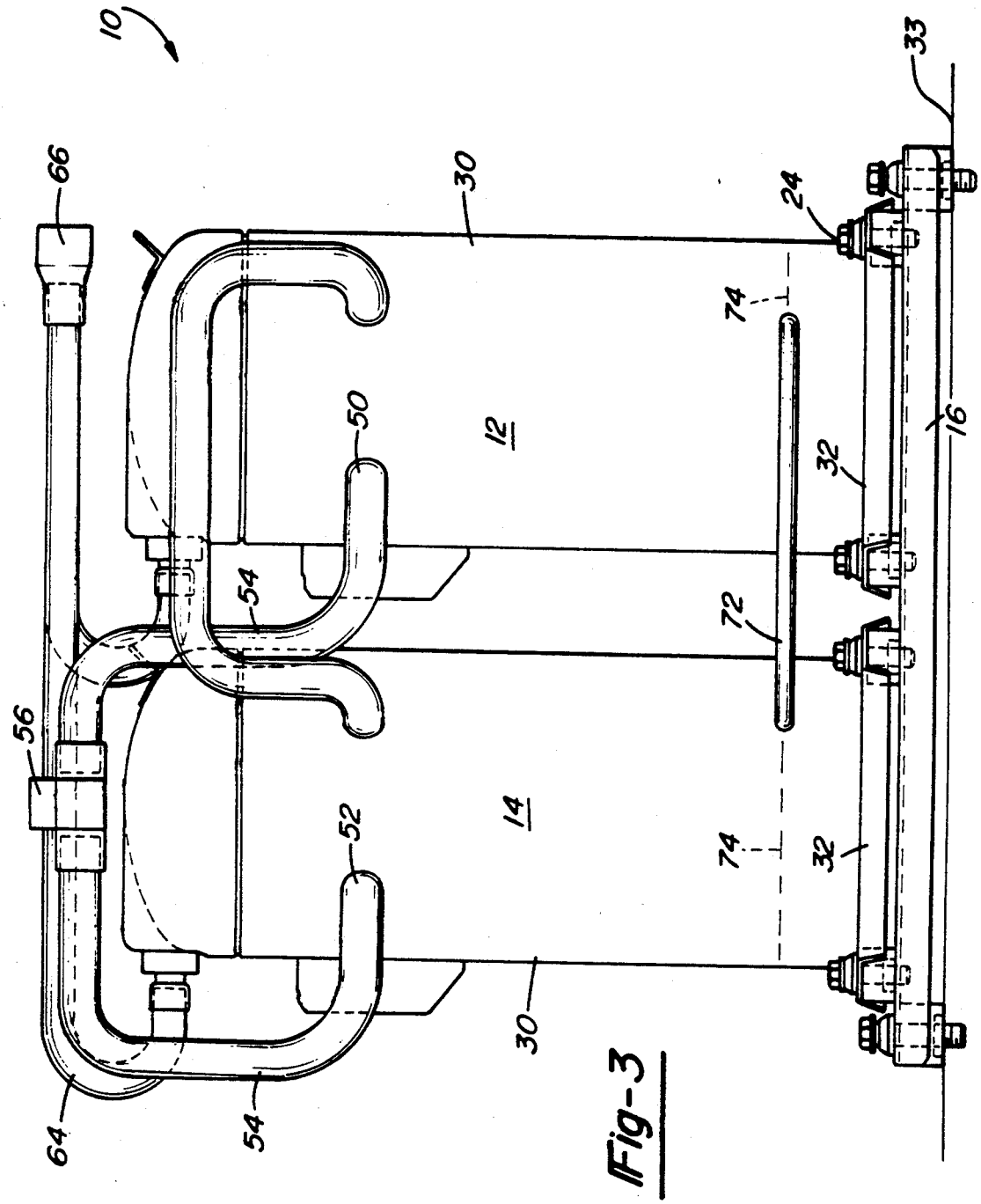

TANDEM COMPRESSOR MOUNTING SYSTEM

FIELD OF THE INVENTION

The present invention relates to mounting and suspension systems. More particularly, the present invention relates to a system for mounting or suspending a tandem compressor on a pair of channel rails in conjunction with a system for mounting or suspending the pair of channel rails on a horizontal surface.

BACKGROUND OF THE INVENTION

Hermetic compressors comprise a motor compressor unit disposed within a hermetically sealed outer housing. An electrical connection is made via a terminal which extends through a sidewall of the housing, while fluid conduits extend through the sidewall to provide an external connection for the refrigerant fluids. When using tandem compressor units, two compressors are mounted adjacent to each other with the fluid conduits, both suction and discharge, coming together to form a single suction inlet fitting and a single discharge outlet fitting for the tandem compressor system. In addition, the tandem compressors may also be interconnected by one or a pair of equalization tubes also extending through the sidewalls of the housing. One equalization tube is normally positioned at a high elevation, above the level of oil, to provide for the equalization of the gasses within the housings. The second equalization tube is normally located at the bottom, coincident with the level of oil, to provide for the equalization of the oil levels within the housings. Tandem hermetic compressors when running singly or when running together generate undesired noise and vibration which can vibrate the fluid conduits and thus impart excessive stresses which will eventually cause breakage of the fluid conduits.

Various prior art structures have been used to mount single compressors as well as mounting each compressor of a tandem compressor system. Normally, in a tandem compressor system, each compressor is first mounted to a common pair of rails which are then mounted to an apparatus. These various prior art compressor mounting structures range from rigidly bolting the individual compressors in position to providing spring systems which attenuate noise and vibration. Sometimes, these spring systems are so soft that the excessive motion caused by starting or stopping of the individual compressors can damage the fluid tubes. The softness of spring suspensions may also require the use of a shipping constraints to prevent excessive motion of the compressors during shipment.

Accordingly, what is needed is an extremely simple and cost effective mounting system for a tandem compressor system which suppresses the vibration radiating from the housings of the individual compressors in order to avoid excessive stresses on the fluid tubes as well as avoiding the other problems associated with the aforementioned systems.

SUMMARY OF THE INVENTION

The present invention provides the art with a mounting system for mounting each of the tandem compressors to a common pair of rails and a system for mounting the common rails to a horizontal surface of an apparatus. The present invention comprises a plurality of stiff rubber grommets for mounting each of the compressors to common rails and a plurality of relatively soft rubber grommets for mounting the rails to a horizontal surface of an apparatus.

Other advantages and objects of the present invention will become apparent to those skilled in the art from the subsequent detailed description, appended claims and drawings.

DESCRIPTION OF THE DRAWINGS

In the drawings which illustrate the best mode presently contemplated for carrying out the present invention:

FIG. 3 is a side elevational view of the opposite side of the tandem compressor system of FIG. 1.

DETAILED DESCRIPTION OF THE PREFERRED EMBODIMENT

Figure 1:
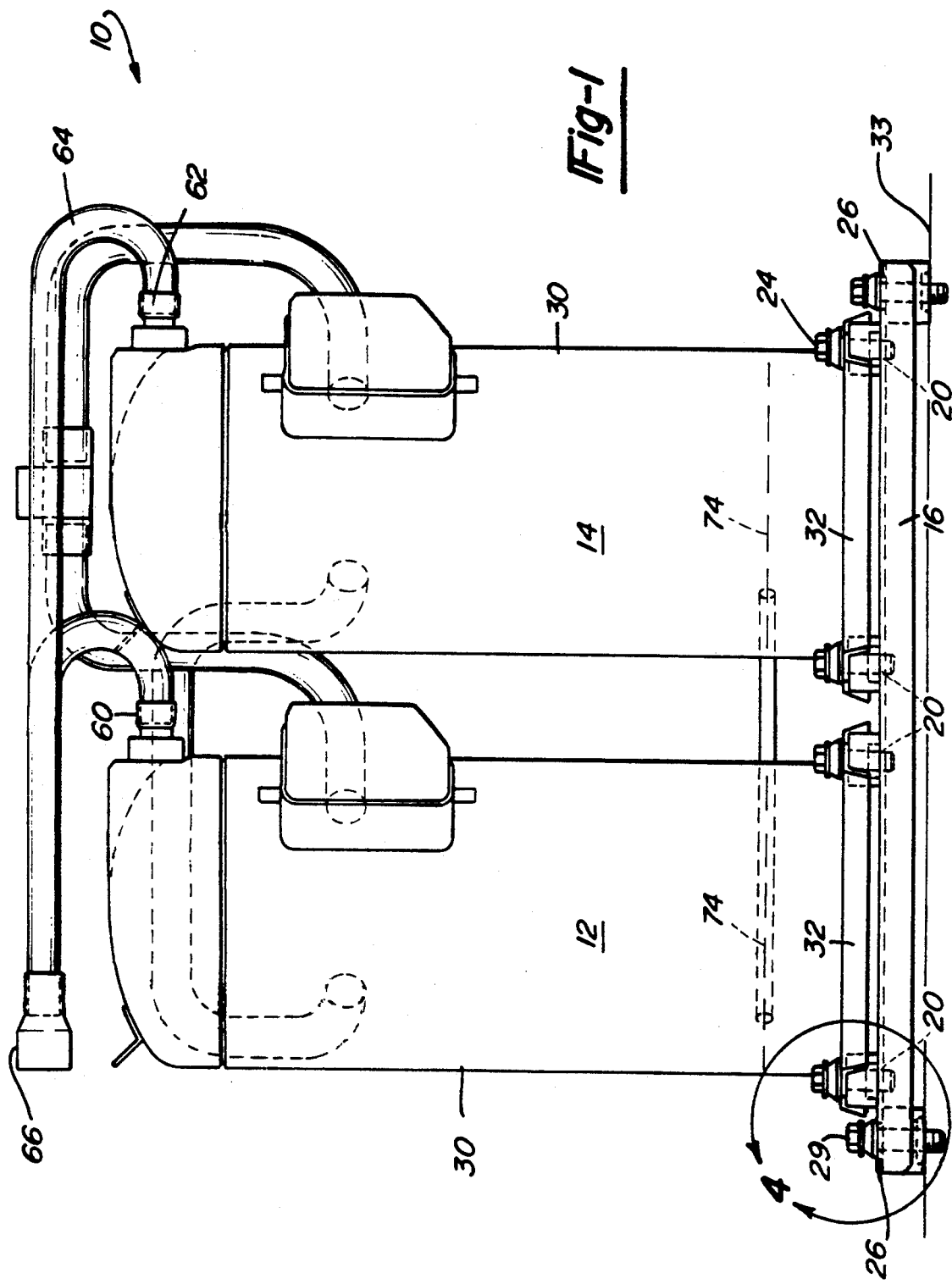
FIG. 1 is a side elevational view of a tandem compressor system incorporating the mounting system of the present invention.

Referring now to the drawings in which like reference numerals designate like or corresponding parts through the several views, there is shown in FIGS. 1 through 4 a tandem compressor system 10 in accordance with the present invention. Tandem compressor 10 comprises a first hermetic compressor 12, a second hermetic compressor 14 and a pair of common rails 16.

Figure 2:
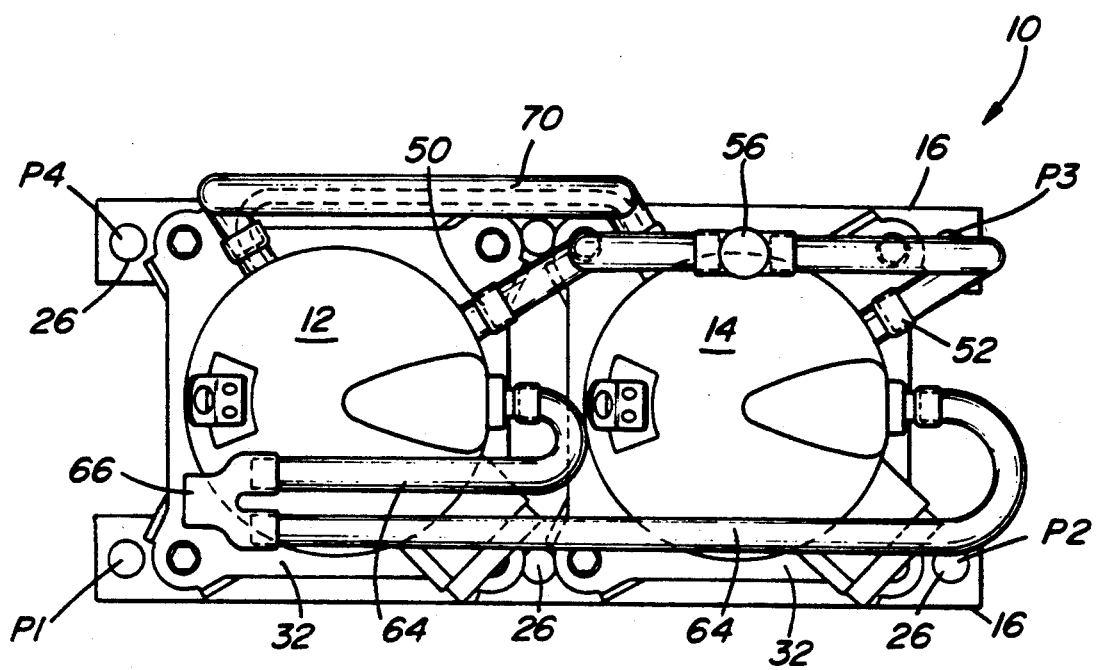
FIG. 2 is a top view of the tandem compressor system of FIG. 1.
Figure 4:
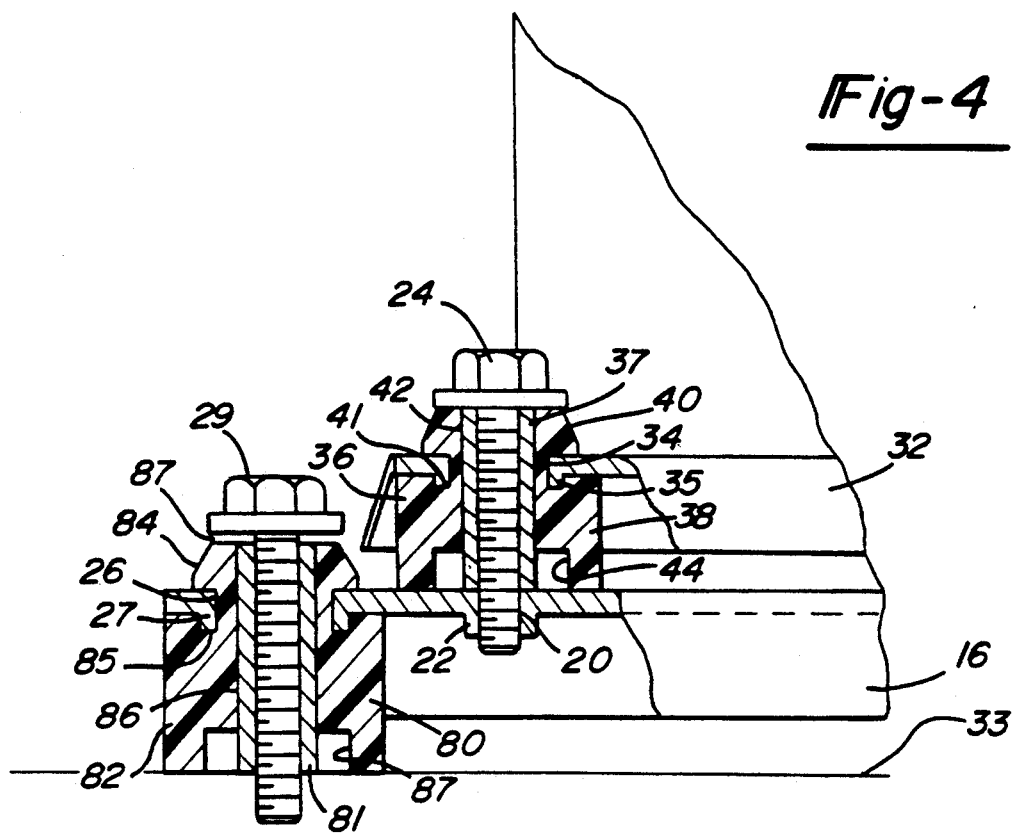
FIG. 4 is an enlarged view of circle 4 in FIG. 1 showing the grommets which mount the compressor to the common rails and the grommets which mount the common rails to a horizontal surface of an apparatus.

The common rails 16 longitudinally extend generally parallel to each other, each of the individual rails 16 being spaced apart from the other a specified distance. Each rail 16 has four through apertures 20, two for mounting each of the compressors 12 and 14. Each aperture 20 is provided with a downward extending annular section 22, best shown in FIG. 4, for facilitating attachment of each compressor by the use of a bolt 24. Each rail 16 further has a pair of through apertures 26 each disposed at opposite ends of rail 16. A third aperture 26 may be located in the center of rail 16 as shown in FIG. 2 if desired. Each aperture 26 is provided with a downward extending annular section 27, best shown in FIG. 4, for engaging a grommet as will be described later herein. Apertures 26 accommodate a grommet for attaching common rails 16 to a generally horizontal surface 33 of an apparatus (not shown) by using attachment bolts 29. Normally, only the apertures 26 disposed at the opposite ends of rail 16 are utilized for attaching common rails 16 to a horizontal surface, but aperture 26 located in the center of common rails 16 may also be utilized for this attachment.

Hermetic compressor 12 is generally identical to hermetic compressor 14 and each comprises a hermetic shell 30 and a mounting plate 32 fixedly attached to shell 30. The hermetic shell 30 of each compressor is hermetically sealed together by welding or brazing. Disposed within shell 30 is a motor compressor unit comprising an electric motor (not shown) and a rotary scroll compressor mechanism (not shown). While the rotary scroll compressor mechanism is being described as an exemplary compressor in the preferred embodiment, the present invention is equally applicable to other types of compressor mechanisms as well.

Each of the compressors 12 and 14 are attached to the pair of common rails 16 by using attachment bolts 24. Mounting plate 32 of each compressor 12 and 14 is provided with four through apertures 34 which correspond to and align with the four apertures 20, two in each of the pair of common rails 16. Each aperture 34 is provided with a downward extending annular section 35, best shown in FIG. 4, for engaging a grommet as will be described later herein. Disposed between each mounting plate 32 and the pair of common rails 16 are a plurality of grommets 36 one for each of the aligned apertures 34 and 20. Each grommet 36 is comprised of a metal cylindrical sleeve 37, a generally cylindrical elastomeric body 38 and an elastomeric hat section 40 integral with and extending from one end of cylindrical body 38. Hat section 40 is used for securing each grommet 36 into a respective through aperture 34 in each mounting plate 32. Cylindrical body 38 is provided with an annular cavity 41 for accommodating the downward extending annular section 35. The engagement of annular section 35 with annular cavity 41 significantly increases the area of contact between the grommet 36 and mounting plate 32 as well as eliminating any contact of sharp edges between the two. This increases the durability of the attachment. Each rubber grommet 36 further has a through bore 42 extending axially through each grommet 36 to accommodate cylindrical sleeve 37. Through bore 42 includes a counterbore 44 located at the end of each grommet 36 opposite to hat section 40. Sleeve 37 is disposed within through bore 42 and is slightly shorter (approximately 1/16") than the height of cylindrical body 38 combined with hat section 40. This slightly shorter relationship provides for a small amount of compression of the elastomeric portion of grommets 36 when attachment bolt 24 is tightened against metal sleeve 37 to produce a snubbing effect.

Each aperture 34 is assembled with grommet 36 and each of the two compressors 12 and 14 are located on the pair of common rails 16. Each compressor 12 and 14 is thus being supported by four grommets 36. Mounting bolt 24 is fed through sleeve 37 of each grommet 36 and threadably received into a respective aperture 20. Downward extending annular section 22 provides for a sufficient number of threads for adequately receiving mounting bolt 24. Mounting bolt 24 is tightened such that sleeve 37 is contacting both mounting bolt 24 and common rail 16. This tightening of mounting bolt 24 slightly compresses the elastomeric portion of grommet 36 due to the shortened length of sleeve 37 as mentioned above.

Compressors 12 and 14 are interconnected by a series of tubes. The suction port 50 of compressor 12 is fluidly connected to the suction port 52 of compressor 14 by fluid tubes 54. A suction fitting 56 is provided to commonize access to both suction ports 50 and 52. The discharge port 60 of compressor 12 is fluidly connected to the discharge port 62 of compressor 14 by fluid tubes 64. A discharge fitting 66 is provided to commonize access to both discharge ports 60 and 62. A pair of equalization tubes 70 and 72 are also provided for the interconnecting of compressors 12 and 14. Tube 70 is located at a high elevation, above the level 74 of oil, to provide for the equalization of the gasses within shells 30. Tube 72 is located at the bottom, coincident with the level 74 of oil, to provide for the equalization of the oil levels within shells 30.

Each of the apertures 26 in the pair of common rails 16 is provided with a grommet 80. Each grommet 80 is comprised of a metal cylindrical sleeve 81, a generally cylindrical elastomeric body 82 and an elastomeric hat section 84 extending from one end of cylindrical body 82. Hat section 84 is used for securing each grommet 80 into a respective through aperture 26 in each common rail 16. Cylindrical body 82 is provided with an annular cavity 85 for accommodating the downward extending annular section 27. The engagement of annular section 27 with annular cavity 85 significantly increases the area of contact between the grommet 80 and common rail 16 as well as eliminating any contact of sharp edges between the two. This increases the durability of the attachment. A through bore 86 extends axially through grommet 80 to accommodate cylindrical sleeve 81. Through bore 86 includes a counterbore 87 located at the end of grommet 80 opposite to hat section 84. Sleeve 81 is disposed within through bore 86 and is substantially equal in height to cylindrical body 82 combined with hat section 84. Thus, tightening of attachment bolt 29 would not result in any compression of the elastomeric portion of grommet 80.

Each aperture 26 is assembled with a grommet 80 by inserting hat section 84 through aperture 26. Thus the pair of common rails 16 are each supported on the generally horizontal surface of an apparatus (not shown) by two rubber grommets 80, three if central aperture 26 is utilized. Mounting bolt 29 is fed through sleeve 81 and threadably received in the apparatus (not shown). Mounting bolt 29 is tightened such that a gap 87 of approximately 1/16 of an inch is left between bolt 29 and sleeve 81. This provides for the floating of the tandem compressor assembly on the grommets 80 and produces a more effective vibration suppression.

Surprisingly, exceptional results have been obtained by using a 65 (60-70) durometer neoprene rubber for each grommet 36 and a 40 (35-45) neoprene rubber for each grommet 80. When measuring the maximum horizontal vibration (in Mils) at points P1, P2, P3 and P4 of FIG. 2 with both of the compressors running at ARI conditions, the above defined mounting system provided horizontal displacement readings of 3.1, 3.2, 4.2 and 2.1 mils, respectively. This compares to corresponding horizontal displacement readings of 8.9, 9.1, 9.0 and 8.4 mils, respectively, for steel grommets 36. Thus, the above defined mounting system significantly reduces the magnitude of the horizontal vibration.

In addition, the maximum tube stress (in ksi) was measured with both compressors running at ARI and during start/stop of both compressors. The 65 durometer rubber grommets 36 provided a reading of 1.8 ksi at ARI and 9.5 ksi during stop/start conditions. The steel grommets 36 provided a reading of 13.5 ksi at ARI and 10.5 ksi during start/stop conditions. The 35 durometer rubber grommets 36 provided a reading of 2.3 ksi at ARI and 23 ksi during start/stop conditions. Thus, it can be seen that the above defined mounting system reduced tube stress down to a level of a soft grommet when operating at ARI but also reduced tube stress to the level of a steel grommet during stop/start. This is due to the fact that the harder rubber is capable of limiting horizontal movement of the compressors during stop/start conditions while at the same time damping out the resonant frequencies during operation of the compressors. While the above data illustrates the dampening effect of the present system while running at ARI conditions, it is also believed that similar results will be obtained during partial capacity running of the compressors as they travel through the various resonant frequencies.

While the above detailed description of the preferred embodiment described for exemplary purposes elastomeric grommets 36 between mounting plate 32 and common rails 16 and elastomeric grommets 80 between common rails 16 and the generally horizontal surface of the apparatus, it is within the scope of the present invention to utilize any type of resilient member for the attachment of compressors 12 and 14 to common rails 16 and for the attachment of common rails 16 to the generally horizontal surface of the apparatus.

While the above detailed description described the preferred embodiment of the present invention, it should be understood that the present invention is susceptible to modification, variation and alteration without deviating from the scope and fair meaning of the subjoined claims.

What is claimed is:

1. A tandem hermetic compressor assembly comprising:
    a first hermetic compressor;
    a first mounting plate attached to said first hermetic compressor;
    a second hermetic compressor;
    a second mounting plate attached to said second hermetic compressor;
    support means for locating said first and second compressors;
    at least one first elastomeric mounting member disposed between said first mounting plate and said support means, said at least one first elastomeric mounting member having a first durometer;
    at least one second elastomeric mounting member disposed between said second mounting plate and said support means, said at least one second elastomeric mounting member having a second durometer, said second durometer being generally equal to said first durometer;
    at least one third elastomeric mounting member disposed between said support means and a support surface, said at least one third elastomeric mounting member having a third durometer, said first durometer being greater than 1.33 times said third durometer.

2. The tandem hermetic compressor assembly of claim 1 wherein said at least one first elastomeric mounting member is removably attached to said first mounting plate.

3. The tandem hermetic compressor assembly of claim 1 wherein said at least one second elastomeric mounting member is removably attached to said second mounting plate.

4. The tandem hermetic compressor assembly of claim 1 wherein said at least one third elastomeric mounting member is removably attached to said support means.

5. The tandem hermetic compressor assembly of claim 1 wherein said at least one third elastomeric mounting member comprises a plurality of elastomeric grommets.

6. The tandem hermetic compressor assembly of claim 5 wherein said plurality of elastomeric grommets are made from 40 durometer neoprene.

7. The tandem hermetic compressor assembly of claim 5 wherein each of said plurality of elastomeric grommets comprises an annular body having a lower end, an upper end, an external surface and an internal surface, said internal surface defining a first cylindrical cavity extending from said lower end towards said upper end and a second cylindrical cavity extending from said first cylindrical cavity to said upper end, said external surface being adapted for securing said elastomeric grommet to said support means.

8. The tandem hermetic compressor assembly of claim 7 wherein said plurality of elastomeric grommets are made from 40 durometer neoprene.

9. The tandem hermetic compressor assembly of claim 1 wherein said at least one second elastomeric mounting member comprises a plurality of elastomeric grommets.

10. The tandem hermetic compressor assembly of claim 9 wherein said plurality of grommets are made from elastomeric material with a hardness greater than 60 durometer.

11. The tandem hermetic compressor assembly of claim 10 wherein said plurality of elastomeric grommets are made from 60 to 70 durometer neoprene.

12. The tandem hermetic compressor assembly of claim 9 wherein each of said plurality of elastomeric grommets comprises an annular body having a lower end, an upper end, an external surface and an internal surface, said internal surface defining a first cylindrical cavity extending from said lower end towards said upper end and a second cylindrical cavity extending from said first cylindrical cavity to said upper end, said external surface being adapted for securing said elastomeric grommet to said second mounting plate.

13. The tandem hermetic compressor assembly of claim 12 wherein said plurality of grommets are made from elastomeric material with a hardness greater than 60 durometer.

14. The tandem hermetic compressor assembly of claim 13 wherein said plurality of grommets are made from 60 to 70 durometer neoprene.

15. The tandem hermetic compressor assembly of claim 1 wherein said at least one first elastomeric mounting member comprises a plurality of elastomeric grommets.

16. The tandem hermetic compressor assembly of claim 15 wherein said plurality of grommets are made from elastomeric material with a hardness greater than 60 durometer.

17. The tandem hermetic compressor assembly of claim 16 wherein said plurality of elastomeric grommets are made from 60 to 70 durometer neoprene.

18. The tandem hermetic compressor assembly of claim 15 wherein each of said plurality of elastomeric grommets comprises an annular body having a lower end, an upper end, an external surface and an internal surface, said internal surface defining a first cylindrical cavity extending from said lower end towards said upper end and a second cylindrical cavity extending from said first cylindrical cavity to said upper end, said external surface being adapted for securing said elastomeric grommet to said first mounting plate.

19. The tandem hermetic compressor assembly of claim 18 wherein said plurality of grommets are made from elastomeric material with a hardness greater than 60 durometer.

20. The tandem hermetic compressor assembly of claim 19 wherein said plurality of elastomeric grommets are made from 60 to 70 durometer neoprene.

21. The tandem hermetic compressor assembly of claim 1 wherein the first and second hermetic compressors include first and second hermetic housings, respectively, the interior of said first housing being in communication with the interior of said second housing.

22. The tandem hermetic compressor assembly of claim 21 wherein each of said first and second housings are partially filled with oil and said interior of said first housing is connected to said interior of said second housing by a tube, said tube being disposed above the levels of oil in said first and second housings.

23. The tandem hermetic compressor assembly of claim 21 wherein each of said first and second housings are partially filled with oil and said interior of said first housing is connected to said interior of said second housing by a tube, said tube being coincident with the levels of oil in said first and second housings.

* * * * *

UNITED STATES PATENT AND TRADEMARK OFFICE
CERTIFICATE OF CORRECTION

PATENT NO. : 5,277,554
DATED : January 11, 1994
INVENTOR(S) : John P. Elson

It is certified that error appears in the above-indentified patent and that said Letters Patent is hereby corrected as shown below:

Column 4, line 37, after "(35-45)" insert -- durometer --.

Signed and Sealed this

Thirty-first Day of May, 1994

Attest:

BRUCE LEHMAN

*Attesting Officer*     *Commissioner of Patents and Trademarks*